United States Patent

Schacht

[15] 3,675,272
[45] July 11, 1972

[54] METHOD OF CUTTING AND PACKING POULTRY

[72] Inventor: Henry Nell Schacht, 2745 Quail Avenue, N, Minneapolis, Minn. 55422

[22] Filed: Aug. 26, 1970

[21] Appl. No.: 66,976

[52] U.S. Cl. .................................... 17/52, 17/11
[51] Int. Cl. ..................................... A22c 21/00
[58] Field of Search ........................ 17/11, 45, 52

[56] References Cited

UNITED STATES PATENTS

| | | | |
|---|---|---|---|
| 2,243,951 | 6/1941 | Gehlke | 17/52 |
| 2,807,046 | 9/1957 | Hebenheimer | 17/11 |
| 3,564,644 | 2/1971 | Cannon | 17/11 |

FOREIGN PATENTS OR APPLICATIONS

| | | | |
|---|---|---|---|
| 1,429,817 | 4/1969 | Germany | 17/11 |

*Primary Examiner*—Lucie H. Laudenslager
*Attorney*—Ronald E. Lund and James V. Harmon

[57] ABSTRACT

Chickens which have been eviscerated and chilled are transferred to a first handling station where they are cut in half transversely. They are then segregated into front and rear halves and transported via segregated channels to a second and a third handling station. The wings are removed at the second handling station and the legs are removed at the third handling station. The parts are then packed in plastic or fiber trays.

6 Claims, 7 Drawing Figures

PATENTED JUL 11 1972
3,675,272
SHEET 1 OF 2
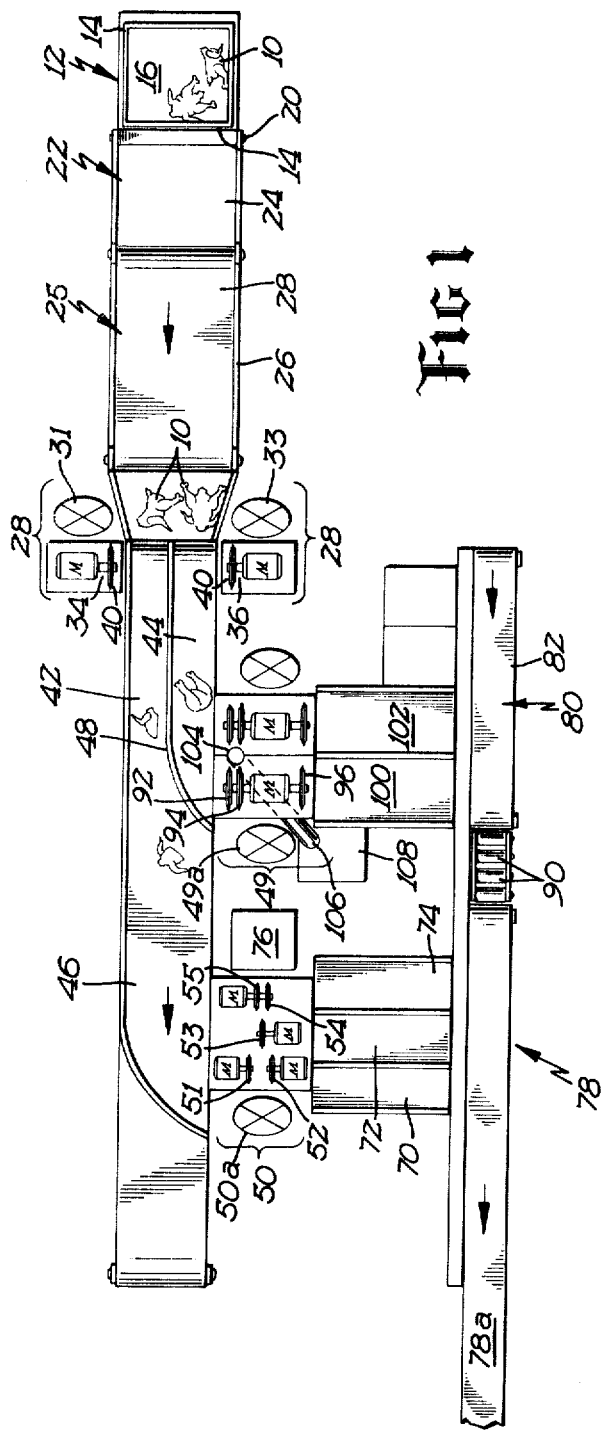
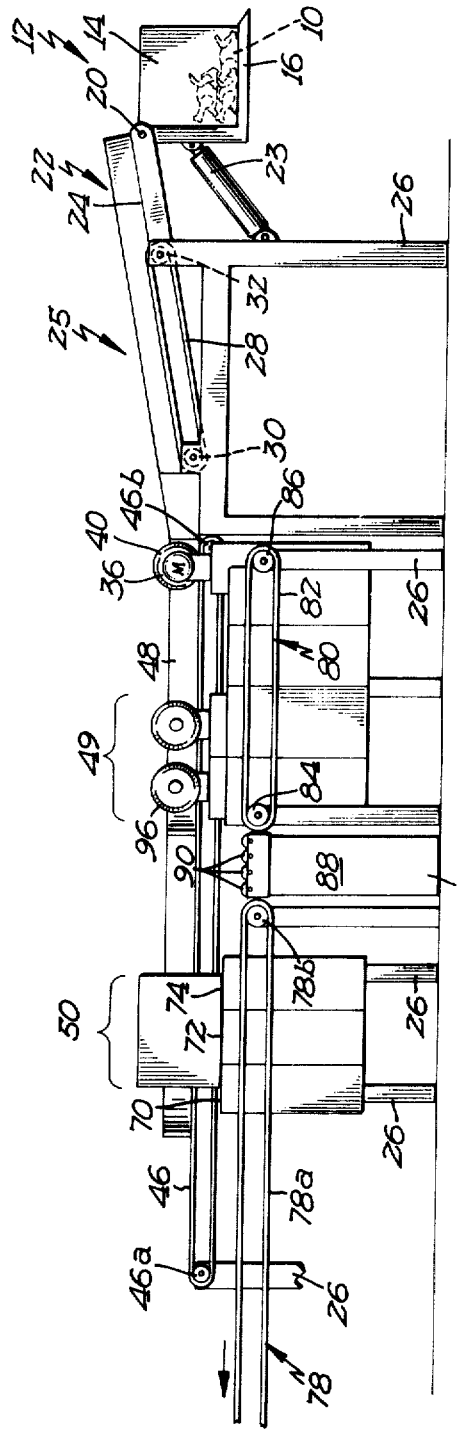
INVENTOR.
HENRY NEIL SCHACHT
BY
*James V. Tomai*
ATTORNEY

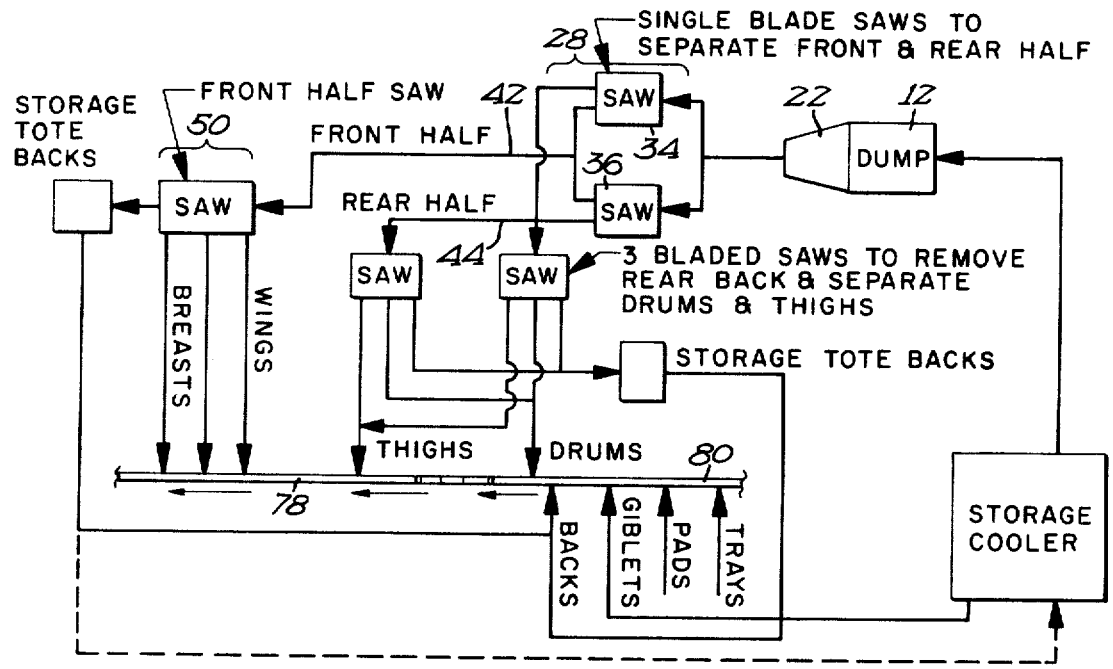
Fig 3
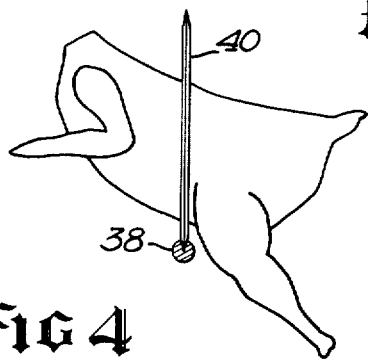
Fig 4
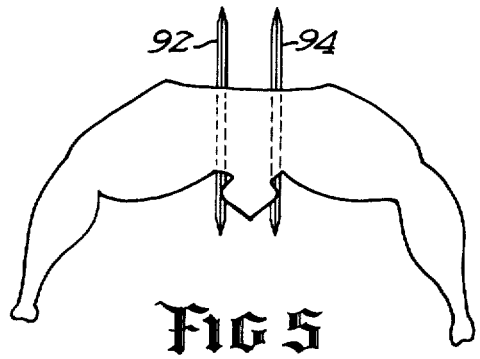
Fig 5
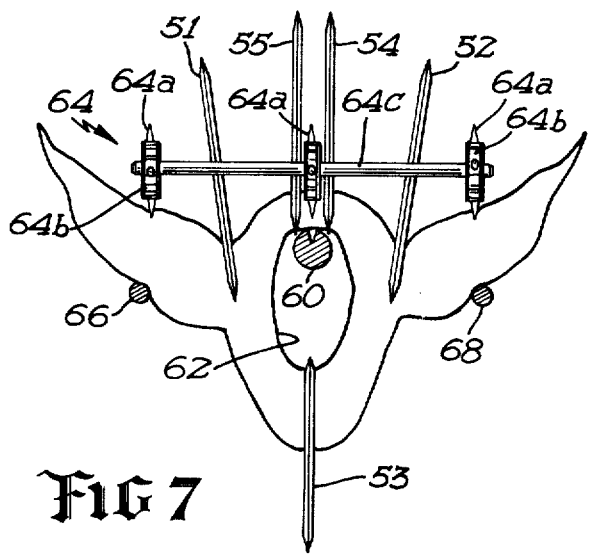
Fig 7
Fig 6
INVENTOR.
HENRY NEIL SCHACHT
BY
ATTORNEY

METHOD OF CUTTING AND PACKING POULTRY

The present invention relates to handling and cutting of poultry in high speed high volume commercial processing plants and more particularly to the cutting, handling and packing of cut-up birds.

Packages of cut poultry have been prepared in processing plants by supporting the birds from shackles connected to an overhead conveyor or cable conveyor. With the birds moving at a constant velocity, operators use knives to remove legs, thighs, wings and breasts. Often, more than one operator is needed to remove a particular part.

In another process, the birds are cut with special saws. A single operator using such a saw removes all the parts from a single bird. The advantage of this system is in the uniformity and accuracy of placement that can be achieved with each cut. Thus, it is possible to reduce the size of the backs to 10% of the whole bird. This is desirable since the consumer places substantially less value in backs. The process, on the other hand, has the disadvantage of providing a non-uniform flow of parts to packing equipment which should be fed at a uniform speed for maximum efficiency. Moreover, a relatively large number of operators are required and there results a poor arrangement of the cut parts at the packing line.

Although complex poultry cutting saws have been made available for preparing broilers and also for removing wings from the front half of the bird, an manual knife cut is still employed for cutting the bird in half. Furthermore, an overhead conveyor is required. This is an item of substantial additional expense and the shackling of birds is a time-consuming operation.

In view of these and other deficiencies of the prior art, it is an object of the present invention to provide an improved method and apparatus for cutting poultry in which the birds need not be placed manually on fixtures such as shackles.

Another object is to provide an approved process and apparatus for preparing packages of cut-up birds wherein a reduction in hand labor is accomplished sufficient to allow five operators to produce cut poultry parts at the rate of 1,800 or more birds per hour.

A further object of the invention is the provision of an improved method and apparatus for preparing packages of cut birds in which the production rates are limited by the speed of the saws used in the cutting operation and not by the speed at which the personnel manning the equipment can transfer the birds to the saws.

Still another object of the invention is the provision of an improved apparatus of the type described which is sanitary, easily cleaned, efficient in operation, rugged in construction, relatively low in cost and facilitates the production of packages of cut birds at high speed.

Yet a further object of the invention is to maintain a continuous flow of birds through the apparatus on a first-in, first-out basis.

A further object of the invention is the provision of a process that lends itself both to the production of packages containing mixed parts and packages containing several identical pieces.

These and other more detailed specific objects will become apparent in the following description of the invention and from the drawings wherein:

FIG. 1 is a plan view of one form of device that can be used for carrying out the invention.

FIG. 2 is a side elevational view of the apparatus in FIG. 1.

FIG. 3 is a schematic diagram of the process employed in the invention.

FIG. 4 is a side view of a chicken showing the first transverse cut.

FIG. 5 is a view showing the cuts that are made to separate the legs from the rear portion of the bird.

FIG. 6 is a view showing the cutting of the legs from the thighs and

FIG. 7 is a view showing the removal of wings from the front half of the bird and the longitudinal separation thereof.

Briefly, in accordance with the invention, poultry such as chicken, ducks, pheasants, geese are provided for cutting in a whole, eviscerated, and usually chilled condition. The birds are transferred to a first work station where they are cut in half transversely. The front halves and the rear halves are then segregated and conveyed separately to second and third work stations. This is accomplished by placing the fronts in a first transfer channel and the rears in a second transfer channel. Typically, the channels comprise parallel longitudinally extending segments of an endless conveyor which are separated by a longitudinally extending stationary panel positioned above the conveyor. At the second work station the parts are picked up by operators and the wings are removed from the bodies, simultaneously the body is cut longitudinally. On the ventral side, the body is cut on a single axially extending line whereas on the dorsal side of the body two cuts are usually made, each spaced laterally a short distance from the mid-line.

In the accomplishment of the foregoing and related ends, the invention then comprises the features hereinafter fully described and particularly pointed out in the claims, the following description setting forth in detail certain illustrative embodiments of the invention, these being indicative, however, of but a few of the various ways in which the principles of the invention may be employed.

Referring now to the figures and particularly FIG. 1 through 3, whole birds 10 that are to be cut are provided in an eviscerated and chilled condition. Bulk shipping containers containing for example 500 to 1,000 birds, are placed in a dumper 12 which is composed of a bin having side walls 14 and a bottom 16 and is articulated at 20 to a chute 22. An elevating means such as an hydraulic actuator 23 is connected between the bin 12 and a framework 26 in a position to elevate the free end of the bin 12 sufficiently to dump the birds periodically from the bin 12 onto the chute 22. The chute 22 is provided with an inclined inlet end section 24, an endless conveyor section 24 composed of a belt 28 entrained over a pair of rolls 30 and 32 that function during operation to transfer the whole birds to a first work station indicated at 28.

Work station 28 includes a location for two operators 31 and 33 and two motor-operated saws 34 and 36 of a suitable known construction. When the birds arrive at the work station 28, the operators 31 and 33 use the saws as shown in FIG. 4 to produce a transverse cut for separating the fronts from the rears. In doing so, the birds are advanced over a guide bar 38 and are cut as they are advanced laterally by one of the blades 40.

From the work station 28, the fronts and rears are segregated by placing them in a first channel 42 for fronts or a second channel 44 for rears. The channels are defined by the halves of an endless belt conveyor 46, entrained over rolls 46a and 46b driven in a given feed direction to transfer the birds from right to left in the figures. The channels are maintained separate from one another by a partition 48. In this manner the rears are delivered to a second work station 49 and the fronts are delivered to a third work station 50.

The third work station is employed for separating the wings from the fronts and is provided with a space for a second operator 50a and a cutting table upon which are mounted five saws 51, 52, 53, 54, and 55. The saws are of the circular rotating type powered by suitable motors.

While the saws 51 through 55 can be arranged in various ways, it is preferred to position the blades 51 and 52 as seen in FIG. 7 on an inclined axis, to locate the blade 53 in a vertical central position and blades 54 and 55 at a higher elevation than blades 51 and 52 and parallel to one another so that two longitudinally extending laterally spaced cuts are made equidistant from the spinal cord on the dorsal side of the bird. Each bird is oriented with respect to the blades by means of a horizontally disposed longitudinally oriented stationary guide bar 60 which extends axially through the coelomic cavity 62. The operator 50a places the birds on the bar 60 manually. A suitable conveying or advancing mechanism such as an endless chain conveyor 64 engages the tops of the wings to advance the bird longitudinally through the apparatus or away from the view as seen in FIG. 7. The wings are supported by longitudinally extending parallel horizontally disposed stationary guide rods 66 and 68.

The conveyor 64 can be conveniently consist of laterally spaced chains 64 entrained over sprockets 64b which are supported upon laterally extending horizontally disposed drive shafts 64c and a similar sprocket support shaft (not shown( which is spaced longitudinally from shaft 64c. If desired, the saws 51 through 55 can be purchased commercially in a single bird cutting machine such as machines built by the Gainesville Machinery Company of Gainesville, Georgia or the machine known as Breast or Hock Poultry Cutting Machine by Horace De Long, Maintenance Inc. of Gainesville, Georgia.

As shown in FIG. 1, the parts produced at work station 50 are separated from one another within three inclined chutes or bins or conveyors 70, 72, and 74. Wings are placed in chute 70, left breasts in 72 and right breasts in 74. The front portion of the backs are placed in separate storage container such as a tray 76. The chutes 70, 72, and 74 are inclined downwardly in the direction of a packaging conveyor 78 so that they automatically gravitate toward the conveyor 78 as the chutes become filled.

The back conveyor 78 consists of an endless belt 78a entrained over spaced rolls, only one of which (78b) is shown and a suitable drive (not shown) for advancing the upper portion of the belt 78 toward the left in the figures. The conveyor 78 is fed from the right by a conveyor 80 composed of an endless belt 82 entrained over drive rolls 84 and 86 and rotated in the appropriate direction to feed trays of products to the conveyor 78. Personnel access is made possible by a removable section 88, composed of a support 89 and idler rolls 90.

The cutting station 49 at which an operator 49a separates drum sticks and thighs from the rear half of the body will now be described. The rear halves are placed as seen in FIG. 5 between parallel vertically disposed saw blades 92 and 94. The legs are then cut to provide thighs and drumsticks by the blade 96 as seen in FIG. 6. The joint is supported by a guide bar 98 as this is done. The drumsticks are then placed in a bin 100 having a lower wall inclined downwardly toward the conveyor 80 while the thighs are placed in a bin 102 having a lower wall inclined in the same direction. In this way the drumsticks and thighs collect adjacent to the conveyor 80 where operators placed them on trays in appropriate combination. The backs drop to an opening 104 and are fed through a tube 106 and to a tray 108 for backs.

The invention has a number of advantages over the prior art. First, it will be noted that it is unnecessary to shackle the birds. It was also found possible using five operators to provide cut poultry parts at the rate of 1,800 birds per hour and operating speed is limited primarily by the speed limitations of the various pieces of the cutting and conveying machinery rather than by the speed at which the operators' hands move. The equipment can also be readily cleaned and maintained in a sanitary condition.

The invention also provides cut parts on a first-in, first-out basis. In addition, because the thighs and drumsticks are located adjacent to one another and the wings and breasts adjacent to one another at a second location, it is possible for trays to be packed efficiently in the packaging of both single part packages and in mixed part packages.

I claim:

1. A process for preparing cut poultry parts from whole birds comprising, providing three spaced apart work stations, providing a first transfer channel between a first work station and a second work station and a second transfer channel between the first work station and a third work station, cutting the bird into two parts transversely between the legs and the wings at the first work station, segregating the cut birds, placing fronts in one transfer channel and rears in the other transfer channel, separating the legs from the rear half of the body at the second station and separating the wings from the front half of the body at the third station and packing the cut parts.

2. The process of claim 1 wherein spaced apart cutting means are provided, the spacing between the cutting means being approximately the same as the spacing between the points at which the legs join the body and said backs are forced through the cutting means such that the legs are simultaneously cut from the bodies.

3. The process of claim 1 wherein a continuously operating transfer means is provided upstream from the first work station, said whole birds are placed on the transfer means and conveyed to the first work station.

4. The process of claim 1 wherein the poultry comprises chickens, and are then transferred in separate channels to a second and third work station, the legs are simultaneously separated from the rear half of the body at the second work station and the wings are simultaneously separated from the body at the third work station.

5. The process of claim 1 wherein the poultry comprises chickens, and the resulting parts are then transferred in separate channels to a second and third work station, the legs are simultaneously separated from the rear half of the body at the second work station and the wings are simultaneously separated from the body at the third work station and spaced apart cutting means are provided at the second work station, the spacing between the cutting means being approximately the same as the spacing between the points at which the legs join the body and the rear portions are forced through the cutting means at the second work station such that the legs are simultaneously cut from the bodies.

6. The process of claim 1 wherein a conveying means is operatively associated with the third work station, spaced apart saw means is provided at the third work station in spaced relationship to the conveying means and the front half of the body is placed in engagement with the conveying means, driving the conveying means in the proper direction to draw the front half of the body through the saws, maintaining the spacing between the saws so as to position the cutting edges of the saws at the same distance apart as the points at which the wings join the body and advancing the conveying means to thereby move the birds through the saws to simultaneously sever the wings from the front half of the body.

* * * * *